(12) United States Patent
Kawashima

(10) Patent No.: US 10,447,191 B2
(45) Date of Patent: Oct. 15, 2019

(54) POWER CONVERSION DEVICE

(71) Applicant: DAIKIN INDUSTRIES, LTD., Osaka-shi, Osaka (JP)

(72) Inventor: Reiji Kawashima, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 330 days.

(21) Appl. No.: 14/917,835

(22) PCT Filed: Sep. 30, 2014

(86) PCT No.: PCT/JP2014/005007
§ 371 (c)(1),
(2) Date: Mar. 9, 2016

(87) PCT Pub. No.: WO2015/045425
PCT Pub. Date: Apr. 2, 2015

(65) Prior Publication Data
US 2016/0226425 A1    Aug. 4, 2016

(30) Foreign Application Priority Data

Sep. 30, 2013   (JP) .................................. 2013-205576

(51) Int. Cl.
*H02P 27/06* (2006.01)
*H02P 9/48* (2006.01)
(Continued)

(52) U.S. Cl.
CPC ............... *H02P 27/06* (2013.01); *H02J 3/01* (2013.01); *H02M 1/12* (2013.01); *H02M 5/45* (2013.01);
(Continued)

(58) Field of Classification Search
CPC ............. H01L 23/36; H02M 1/14; H02P 3/18
See application file for complete search history.

(56) References Cited

U.S. PATENT DOCUMENTS

2006/0213890 A1* 9/2006 Kooken ................. B23K 9/095
219/130.21
2010/0080028 A1* 4/2010 Cheng ................. H02M 5/4585
363/126

FOREIGN PATENT DOCUMENTS

CN    1411118 A    4/2003
JP    11-196565 A    7/1999
(Continued)

OTHER PUBLICATIONS

International Search Report, issued in PCT/JP2014/005007, PCT/ISA/210, dated Jan. 6, 2015.
(Continued)

*Primary Examiner* — Bickey Dhakal
*Assistant Examiner* — Charles S Laughlin
(74) *Attorney, Agent, or Firm* — Birch, Stewart, Kolasch & Birch, LLP

(57) ABSTRACT

Disclosed herein is a technique for reducing harmonics resulting from the rotation of a motor and generated in a power supply current. This power converter device includes a compensation current generator (52) configured to control compensation currents (Icr, Ics, Ict) flowing between itself (52) and an AC power supply (12), and a compensation controller (60; 260) configured to obtain output voltage instruction values (Vid, Viq) such that the compensation currents (Icr, Ics, Ict) cancel a harmonic component in load currents (Ir, Is, It) flowing from the AC power supply (12) into a rectifier (22) and resulting from the rotation of the motor (16) and a harmonic component in the load currents (Ir, Is, It) and dependent on a period (Ts) of a voltage of the AC power supply (12).

8 Claims, 12 Drawing Sheets

(51) Int. Cl.

| | |
|---|---|
| *H02P 6/18* | (2016.01) |
| *H02P 27/04* | (2016.01) |
| *H02P 21/22* | (2016.01) |
| *H02P 29/50* | (2016.01) |
| *H02M 1/12* | (2006.01) |
| *H02J 3/01* | (2006.01) |
| *H02M 5/45* | (2006.01) |

(52) U.S. Cl.
CPC .............. *H02P 21/22* (2016.02); *H02P 27/04* (2013.01); *H02P 29/50* (2016.02); *Y02E 40/40* (2013.01)

(56) References Cited

FOREIGN PATENT DOCUMENTS

| JP | 2001-186752 A | 7/2001 |
|---|---|---|
| JP | 2012-143094 A | 7/2012 |
| JP | 2013-158099 A | 8/2013 |

OTHER PUBLICATIONS

Beig, et al. "A Novel CSI-Fed Induction Motor Drive", IEEE Transactions on Power Electronics, vol. 21, No. 4, Jul. 2006, pp. 1073-1082, XP055301483.

Bhattacharya, et al. "Active Filter Sstem Implementation", IEEE Industry Applications Magazine, IEEE Service Center, Piscataway, NJ, vol. 4, No. 5, Sep. 1998, pp. 47-63, XP000848885.

Extended Search Report dated Aug. 17, 2017 in corresponding European Application No. 14847397.8.

Lee et al. "A Three-Phase Parallel Active Power Filter Operating with PCC Voltage Compensating Using Reactive Power", Power Electronics Specialists Conference, 2000, PESC 00. 2000 IEEE 31S T Annual Jun. 18-23, 2000, Piscataway, NJ, IEEE vol. 3, Jun. 18, 2000, pp. 1330-1335, XP010518953, ISBN: 978-0-7803-5692-4.

\* cited by examiner

POWER CONVERSION DEVICE

TECHNICAL FIELD

The present invention relates to a power converter device configured to convert an AC voltage into an AC voltage with various frequencies, and more particularly relates to a measure for reducing harmonics.

BACKGROUND ART

A power converter including a rectifier for converting an AC voltage of an AC power supply into a DC voltage, an electrolytic capacitor for smoothing the DC voltage, and a voltage-type inverter for converting the DC voltage into an AC voltage has been generally used widely.

For example, Patent Document 1 discloses a power supply harmonic suppressor for compensating for a harmonic current flowing from a power supply to such a general power converter. Paying attention to the fact that a harmonic current has periodicity, of which one period corresponds to that of a power supply frequency, this power supply harmonic suppressor calculates the integral of the magnitudes of errors between compensation instructions and actually compensated outputs in each phase of the supply voltage, and controls the compensated output of the power supply harmonic suppressor based on that result.

CITATION LIST

Patent Document

PATENT DOCUMENT 1: Japanese Unexamined Patent Publication No. 2001-186752

SUMMARY OF INVENTION

Technical Problem

A power converter which does not use any electrolytic capacitors and which is designed such that a DC voltage output from a rectifier has pulsations corresponding to a power supply frequency is also known. Such a power converter does not need any electrolytic capacitors or reactors of a relatively large size, and therefore, may have a reduced size. In such a power converter, however, no electrolytic capacitors functioning as energy storage elements are used, and only capacitors with a relatively small capacitance are used. Thus, pulsations are generated in the DC voltage and active power. Particularly when the power converter drives a concentrated winding motor, the current supplied from an AC power supply will include a lot of harmonics resulting from the rotation of the motor.

The power supply harmonic suppressor of Patent Document 1 may compensate for harmonics, of which one period corresponds to that of the power supply frequency, and thereby reduce the harmonics of the power supply current. However, the frequency of harmonics caused by a motor rotating at various velocities does not agree with the power supply frequency. Thus, the power supply harmonic suppressor of Patent Document 1 is unable to compensate for such harmonics.

It is therefore an object of the present invention to reduce the harmonics of a power supply current resulting from the rotation of a motor.

Solution to the Problem

A power converter device according to a first aspect includes: a power converter (20); and a current compensator (40). The power converter (20) includes: a rectifier (22) configured to rectify alternating current supplied from an AC power supply (12) and output pulsating direct current; an inverter (28) configured to convert the direct current into alternating current to drive a motor (16); and a small-capacitance capacitor (26) connected between input nodes of the inverter (28). The current compensator (40) includes: a current compensating capacitor (54); a compensation current generator (52) having an input connected to the AC power supply (12) and an output connected to the current compensating capacitor (54), and performing a switching operation in accordance with a drive signal (Scd), thereby controlling compensation currents (Icr, Ics, Ict) flowing between itself (52) and the AC power supply (12); a compensation controller (60; 260) configured to obtain output voltage instruction values (Vid, Viq) such that the compensation currents (Icr, Ics, Ict) cancel a harmonic component included in load currents (Ir, Is, It) flowing from the AC power supply (12) into the rectifier (22) and resulting from rotation of the motor (16) and a harmonic component included in the load currents (Ir, Is, It) and dependent on a period (Ts) of a voltage of the AC power supply (12); and a drive signal generator (56) configured to generate the drive signal (Scd) based on the output voltage instruction values (Vid, Viq).

According to this aspect, the compensation controller (60) obtains output voltage instruction values (Vid, Viq) such that the reactive component of the compensation currents (Icr, Ics, Ict) cancels a harmonic component resulting from rotation of the motor (16) and a harmonic component dependent on a period (Ts) of a voltage of the AC power supply (12). Thus, the harmonics to be caused in a power supply current by rotating the motor (16) may be reduced. The harmonics of the power supply current may be reduced particularly significantly in a power converter device which uses only a capacitor with a relatively small capacitance and which is configured such that a DC voltage output from a rectifier has pulsation corresponding to the power supply frequency.

A power converter device according to a second aspect is an embodiment of the power converter device according to the first aspect. The power converter device according to the second aspect further includes a reactor (24) connected between an output node of the rectifier (22) and one of the input nodes of the inverter (28). An inductance of the reactor (24) and a capacitance of the small-capacitance capacitor (26) are set such that a filter formed by the reactor (24) and the small-capacitance capacitor (26) attenuates a current component having the same frequency as a carrier used for generating a control signal for the inverter (28).

According to this aspect, a current component having the same frequency as a carrier used for generating a control signal for the inverter (28) may be prevented from flowing out into the AC power supply (12).

A power converter device according to a third aspect is an embodiment of the power converter device according to the first aspect. In the third aspect, the output voltage instruction values (Vid, Viq) include an active voltage instruction value (Vid) and a reactive voltage instruction value (Viq). The compensation controller (60; 260) obtains the active voltage instruction value (Vid) such that an active component of the compensation currents (Icr, Ics, Ict) cancels a harmonic component in the load currents (Ir, Is, It) flowing from the AC power supply (12) into the rectifier (22) and resulting from the rotation of the motor (16), and obtains the reactive voltage instruction value (Viq) such that a reactive component of the compensation currents (Icr, Ics, Ict) cancels a harmonic component in the load currents (Ir, Is, It) and dependent on the period (Ts) of the voltage of the AC power supply (12).

According to this aspect, the harmonic component resulting from the rotation of the motor (16) may be suppressed with the active voltage instruction value (Vid) and the harmonic component dependent on a period (Ts) of the voltage of the AC power supply (12) may be suppressed with the reactive voltage instruction value (Viq).

A power converter device according to a fourth aspect is an embodiment of the power converter device according to the third aspect. In the fourth aspect, the compensation controller (60) includes: a high-pass filter (71) configured to extract and output a high-frequency component (imot) from the active component of the load currents; an adder (72) configured to output a result of addition (id*) by adding a voltage correction value (Vcn), obtained based on a result of subtraction that has been calculated by subtracting a voltage (Vdc) of the current compensating capacitor (54) from its instruction value (Vdc*), to an output of the high-pass filter (71); an active current controller (76; 276; 376; 476) configured to obtain the active voltage instruction value (Vid) such that the active component (id) of the compensation currents cancels the result of addition (id*); and a reactive current controller (78; 278; 378; 478) configured to obtain the reactive voltage instruction value (Viq) such that the reactive component (iq) of the compensation currents cancels a reactive component (iq*) of the load currents.

According to this aspect, the active current controller (76; 276; 376) obtains the active voltage instruction value (Vid) such that the active component (id) of the compensation currents cancels the result of addition (id*), and the reactive current controller (78; 278; 378) obtains the reactive voltage instruction value (Viq) such that the reactive component (iq) of the compensation currents cancels a reactive component (iq*) of the load currents. Thus, the harmonic components in the power supply current may be reduced.

A power converter device according to a fifth aspect is an embodiment of the power converter device according to the fourth aspect. In the fifth aspect, the active current controller (76) includes a first lead compensator (82) configured to delay the result of addition (id*) for a period of time corresponding to one period of rotation (Tm) of the motor (16), thereby adding an apparent phase lead to the result of addition (id*), and obtains the active voltage instruction value (Vid) based on a result of addition (id2*) that has been delayed by the first lead compensator (82). The reactive current controller (78) includes a second lead compensator (92) configured to delay the reactive component (iq*) of the load currents for a period of time corresponding to one period (Ts) of the voltage of the AC power supply (12), thereby adding an apparent phase lead to the reactive component (iq*) of the load currents, and obtains the reactive voltage instruction value (Viq) based on a reactive component (iq2*) of the load currents that has been delayed by the second lead compensator (92).

According to this aspect, the active current controller (76) delays the result of addition (id*) for a period of time corresponding to one period of rotation (Tm) of the motor (16), thereby adding an apparent phase lead to the result of addition (id*) of which the waveform is a repetition of similar waveform patterns in a steady state. Also, the reactive current controller (78) delays the reactive component (iq*) of the load currents for a period of time corresponding to one period (Ts) of the voltage of the AC power supply (12), thereby adding an apparent phase lead to the reactive component (iq*) of the load current of which the waveform is a repetition of similar waveform patterns in a steady state. Thus, the influence of the delay caused by the current compensator (40) may be reduced.

A power converter device according to a sixth aspect is an embodiment of the power converter device according to the fifth aspect. In the sixth aspect, the active current controller (76) further includes: a first subtractor (83) configured to calculate the difference between the result of addition (id2*) delayed by the first lead compensator (82) and the active component (id) of the compensation currents; and a first calculator (84) configured to calculate, as the active voltage instruction value (Vid), at least a value proportional to the difference obtained by the first subtractor (83). The reactive current controller (78) further includes: a second subtractor (93) configured to calculate the difference between the reactive component (iq2*) of the load currents delayed by the second lead compensator (92) and the reactive component (iq) of the compensation currents; and a second calculator (94) configured to calculate, as the reactive voltage instruction value (Viq), at least a value proportional to the difference obtained by the second subtractor (93).

According to this aspect, the first subtractor (83) calculates the deviation of the active component (id) of the compensation currents with respect to the result of addition (id2*) delayed by the first lead compensator (82), and the second subtractor (93) calculates the deviation of the reactive component (iq) of the compensation currents with respect to the reactive component (iq2*) of the load currents delayed by the second lead compensator (92). Thus, the active voltage instruction value (Vid) and the reactive voltage instruction value (Viq) may be obtained appropriately.

A power converter device according to a seventh aspect is an embodiment of the power converter device according to the fifth aspect. In the seventh aspect, the active current controller (376) further includes: a first subtractor (83) configured to calculate the difference between the result of addition (id2*) delayed by the first lead compensator (82) and the active component (id) of the compensation currents; a first calculator (84) configured to calculate at least a value proportional to the difference obtained by the first subtractor (83); a first feed forward controller (88) configured to calculate a value based on the result of addition (id2*) delayed by the first lead compensator (82); and a first adder (85) configured to calculate, as the active voltage instruction value (Vid), the sum of the value obtained by the first calculator (84) and the value obtained by the first feed forward controller (88). The reactive current controller (378) further includes: a second subtractor (93) configured to calculate the difference between the reactive component (iq2*) of the load currents delayed by the second lead compensator (92) and the reactive component (iq) of the compensation currents; a second calculator (94) configured to calculate at least a value proportional to the difference obtained by the second subtractor (93); a second feed forward controller (98) configured to calculate a value based on the reactive component (iq2*) of the load currents delayed by the second lead compensator (92); and a second adder (95) configured to calculate, as the reactive voltage instruction value (Viq), the sum of the value obtained by the second calculator (94) and the value obtained by the second feed forward controller (98).

According to this aspect, the first and second feed forward controllers (88, 98) are provided, and not only feedback control but also feed forward control are performed as well. Thus, the harmonics resulting from the rotation of the motor (16) may be compensated for with good stability.

A power converter device according to an eighth aspect is an embodiment of the power converter device according to the fifth aspect. In the eighth aspect, the current compensator (40) further includes a reactor (48) between the AC power supply (12) and the compensation current generator (52). The active current controller (476) further includes: a first subtractor (83) configured to calculate the difference between the result of addition (id2*) delayed by the first lead compensator (82) and the active component (id) of the compensation currents; a first voltage calculator (81) configured to calculate a voltage (vLd) of the reactor (48) corresponding to the difference obtained by the first subtractor (83); a first storage section (89) configured to store an input value and output the input value after having delayed the input value for one sample period; a second subtractor (87) configured to calculate, and store in the first storage section (89), the difference between the voltage (vLd) of the reactor (48) corresponding to the difference obtained by the first subtractor (83) and an output of the first storage section (89); and a first adder (85) configured to calculate, as the active voltage instruction value (Vid), the sum of the difference obtained by the second subtractor (87) and the voltage of the AC power supply (12). The reactive current controller (478) further includes: a third subtractor (93) configured to calculate the difference between the reactive component (iq2*) of the load currents delayed by the second lead compensator (92) and the reactive component (iq) of the compensation currents; a second voltage calculator (91) configured to calculate a voltage (vLq) of the reactor (48) corresponding to the difference obtained by the third subtractor (93); a second storage section (99) configured to store an input value and output the input value after having delayed the input value for one sample period; a fourth subtractor (97) configured to calculate, and store in the second storage section (99), the difference between the voltage (vLq) of the reactor (48) corresponding to the difference obtained by the third subtractor (93) and an output of the second storage section (99); and a second adder (95) configured to calculate, as the reactive voltage instruction value (Viq), the sum of the difference obtained by the fourth subtractor (97) and the voltage of the AC power supply (12).

According to this aspect, a phase lag of the high-frequency component (imot) may be compensated for, and the influence of a detection delay of a current transformer (14) and a waveform distortion caused by the high-pass filter (71) may be reduced.

A power converter device according to a ninth aspect is an embodiment of the power converter device according to the fourth aspect. In the ninth aspect, the active current controller (276) includes: a first subtractor (83) configured to calculate the difference between the result of addition (id*) and the active component (id) of the compensation currents; a first calculator (84) configured to calculate, as a control value (id_out), at least a value proportional to the difference obtained by the first subtractor (83); a first cyclic controller (86) configured to calculate a result of accumulation (id_rpt) by accumulating over multiple periods, with respect to each of multiple sample points, a corresponding one of a plurality of control values (id_out) obtained by the first calculator (84) in one period of rotation (Tm) of the motor (16); and a first adder (85) configured to calculate, as the active voltage instruction value (Vid), the sum of the control value (id_out) obtained by the first calculator (84) and the result of accumulation (id_rpt) obtained by the first cyclic controller (86). The reactive current controller (278) includes: a second subtractor (93) configured to calculate the difference between the reactive component (iq*) of the load currents and the reactive component (iq) of the compensation currents; a second calculator (94) configured to calculate, as a control value (iq_out), at least a value proportional to the difference obtained by the second subtractor (93); a second cyclic controller (96) configured to calculate a result of accumulation (iq_rpt) by accumulating over multiple periods, with respect to each of multiple sample points, a corresponding one of a plurality of control values (iq_out) obtained by the second calculator (94) in one period (Ts) of the voltage of the AC power supply (12); and a second adder (95) configured to calculate, as the reactive voltage instruction value (Viq), the sum of the control value (iq_out) obtained by the second calculator (94) and the result of accumulation (iq_rpt) obtained by the second cyclic controller (96).

According to this aspect, a plurality of the control values (id_out) obtained by the first calculator (84) at multiple sample points are respectively accumulated over multiple periods of rotation of the motor (16), and a plurality of the control values (iq_out) obtained by the second calculator (94) at multiple sample points are respectively accumulated over multiple periods of the voltage of the AC power supply (12). Thus, the harmonic component of the load current, of which the waveform is a repetition of similar waveform patterns in a steady state, may be reduced.

A power converter device according to a tenth aspect is an embodiment of the power converter device according to the third aspect. In the tenth aspect, the compensation controller (260) includes: a high-pass filter (71) configured to extract and output a high-frequency component (imot) from the active component of the load currents; a delay controller (75) configured to obtain a delay-compensated high-frequency component (Vmot) by compensating for a delay of the high-frequency component (imot) output from the high-pass filter (71); an active current controller (576) configured to calculate a value to obtain the active voltage instruction value (Vid) such that the active component (id) of the compensation currents cancels the voltage correction value (id*) obtained based on a result of subtraction that has been calculated by subtracting the voltage (Vdc) of the current compensating capacitor (54) from its instruction value (Vdc*); an adder (77) configured to obtain, as the active voltage instruction value (Vid), a result of addition by adding the delay-compensated high-frequency component (Vmot) to the value obtained by the active current controller (76); and a reactive current controller (78) configured to obtain the reactive voltage instruction value (Viq) such that the reactive component (iq) of the compensation currents cancels the reactive component (iq*) of the load currents.

According to this aspect, the high-frequency component (imot) of the active component of the load currents is feed-forwarded. This thus improves the responsivity of the control.

Advantages of the Invention

With the power converter device according to any of these first through tenth aspects, the harmonics to be caused in the power supply current by rotating the motor may be reduced. As a result, the harmonics in the power supply current may also be reduced even in a power converter device in which only a capacitor with a relatively small capacitance is used.

DESCRIPTION OF EMBODIMENTS

Figure 1:
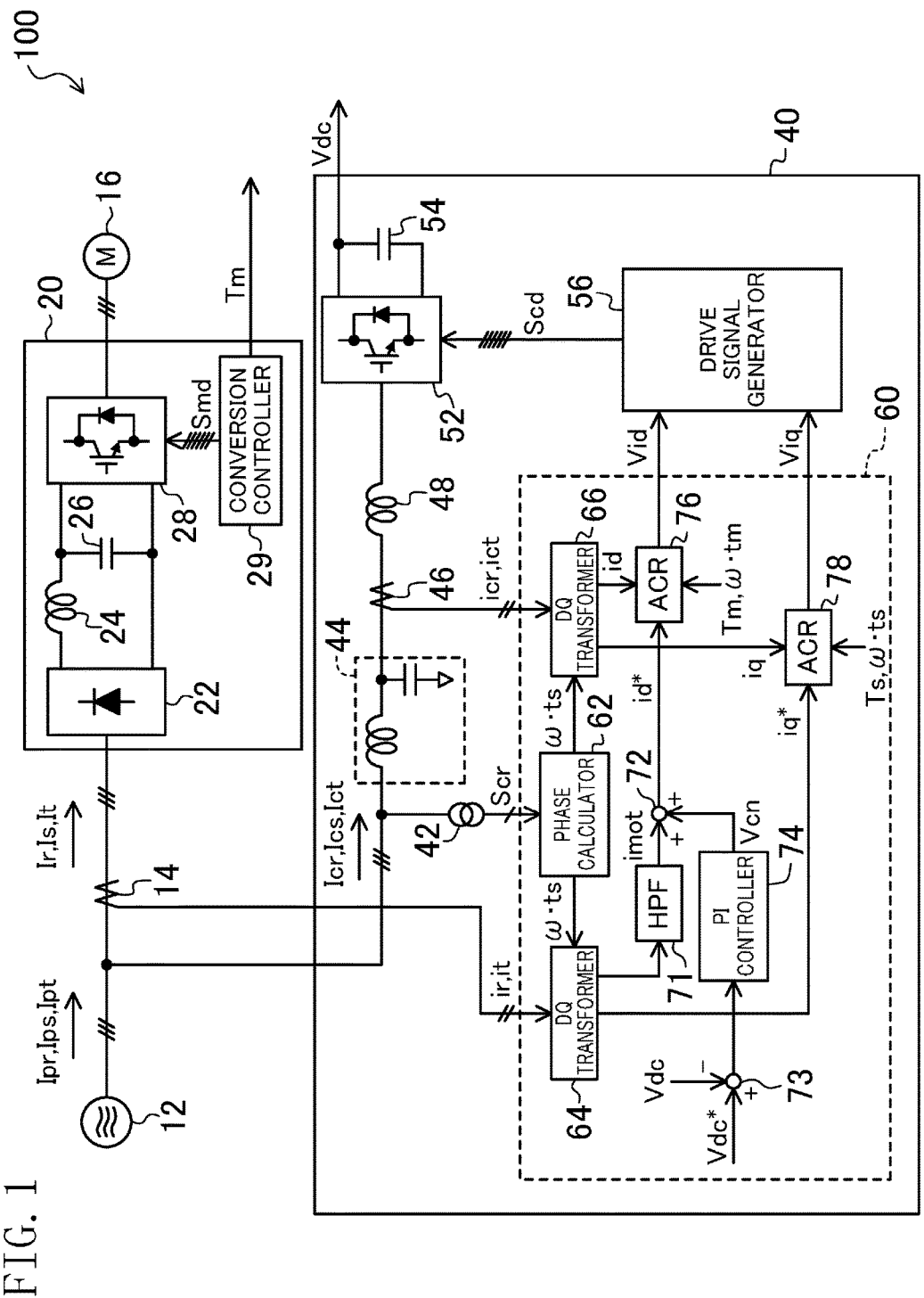
FIG. 1 is a block diagram illustrating an exemplary configuration for a power converter device according to an embodiment of the present invention.

Embodiments of the present invention will now be described with reference to the accompanying drawings, in which each set of same or similar elements that are associated with each other are identified by respective reference numerals, of which the lowest two digits are common among them. Also, the forms of connection include direct connection and indirect connection.

FIG. 1 is a block diagram illustrating an exemplary configuration for a power converter device (100) according to an embodiment of the present invention. The power converter device (100) shown in FIG. 1 includes a power converter (20) and a current compensator (40). The power converter (20) transforms load currents (Ir, Is, It) supplied from an AC power supply (12), which outputs three-phase alternating currents, into currents with any desired frequency, and supplies the currents to a motor (16). The motor (16) is a three-phase AC motor, and may drive a compressor provided for a refrigerant circuit of an air conditioner, for example.

The current compensator (40) receives and supplies compensation currents (Icr, Ics, Ict) from/to the AC power supply (12). In this example, the compensation currents (Icr, Ics, Ict) flowing from the three-phase AC power supply (12) toward the current compensator (40) are regarded herein as currents flowing in the positive (or forward) direction. In any of these phases, each of the supply currents (Ipr, Ips, Ipt) supplied from the AC power supply (12) is the sum of an associated one of the load currents (Ir, Is, It) and an associated one of the compensation currents (Icr, Ics, Ict).

In the following example, the AC power supply (12) is supposed to be a power supply that outputs three-phase alternating currents. However, the AC power supply (12) may also be a power supply that outputs a single-phase alternating current or currents with any other number of phases.

—Power Converter—

Figure 2:
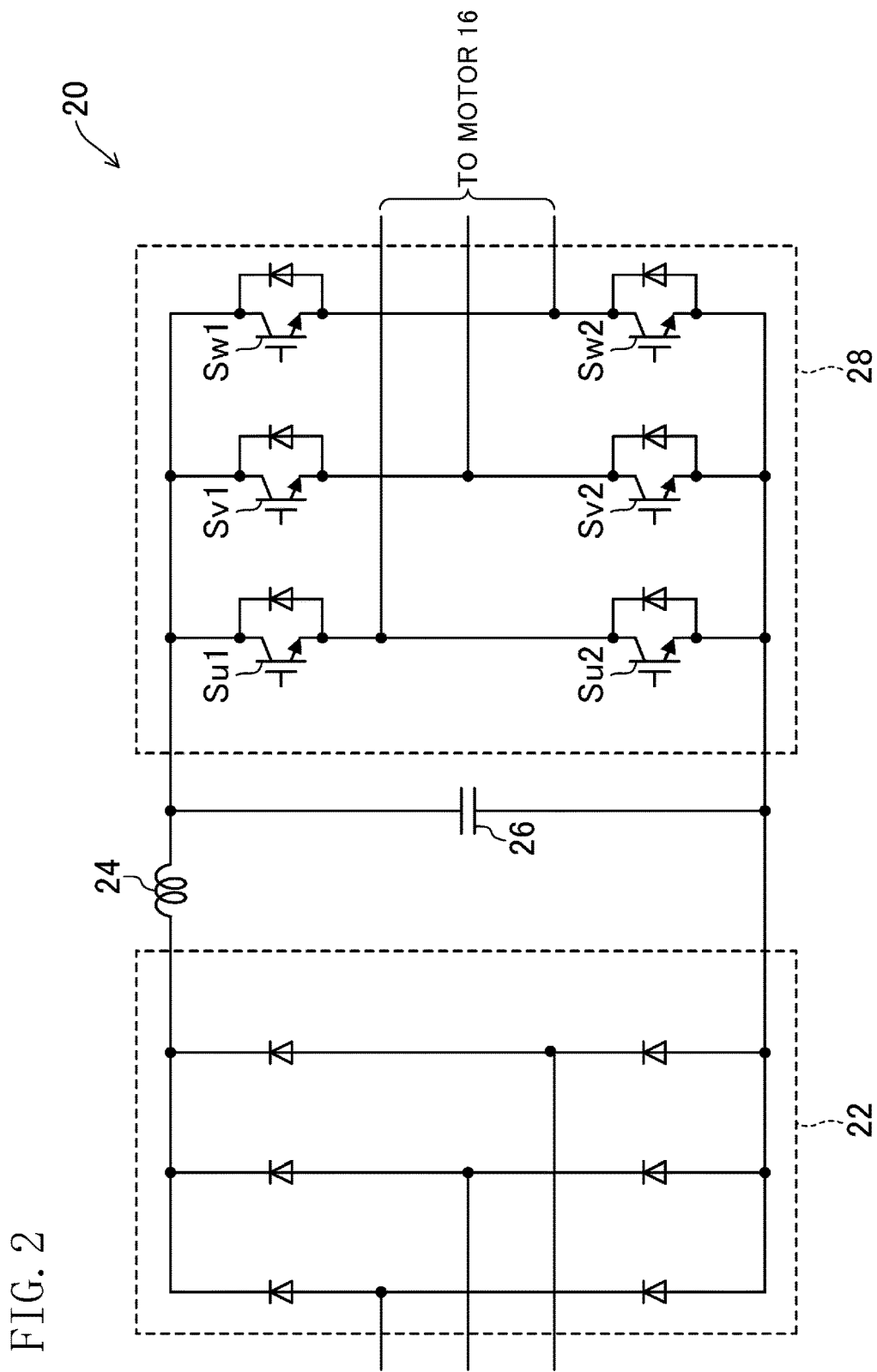
FIG. 2 is a circuit diagram illustrating an exemplary configuration for the power converter shown in FIG. 1.

FIG. 2 is a circuit diagram illustrating an exemplary configuration for the power converter (20) shown in FIG. 1. The power converter (20) includes a rectifier (22), a reactor (24), a small-capacitance capacitor (26), an inverter (28), and a conversion controller (29). The rectifier (22) is connected to the AC power supply (12) and performs full-wave rectification on the alternating current supplied from the AC power supply (12), thereby outputting a pulsating direct current (i.e., a pulsating current). In this example, the rectifier (22) is comprised of six diodes.

One terminal of the reactor (24) is connected to one of the two output nodes of the rectifier (22), while the other terminal of the reactor (24) is connected to one of the two input nodes of the inverter (28). The capacitor (26) is connected between the other terminal of the reactor (24) and the other output node of the rectifier (22). The capacitor (26) is connected between the two output nodes of the rectifier (22) via the reactor (24). The capacitor (26) is supplied with the pulsating direct-current voltage output from the rectifier (22). The capacitor (26) is also connected between the two input nodes of the inverter (28).

The capacitor (26) may be a film capacitor, for example. This capacitor (26) has such a static capacitance that allows itself (26) to smooth only a ripple voltage (i.e., a voltage variation) generated at a switching frequency while the switching elements (to be described later) of the inverter (28) are performing a switching operation. That is to say, the capacitor (26) is a small-capacitance capacitor that does not have such a static capacitance that allows itself (26) to smooth the pulsating output voltage of the rectifier (22). In other words, the capacitor (26) does not have such a static capacitance that allows itself (26) to cancel the voltage variation in this pulsating current dependent on a periodic variation in the voltage of the AC power supply (12). Thus, the voltage of the capacitor (26) and the output voltage of the rectifier (22) have pulsation, and the ratio of their maximum value to their minimum value is relatively large. This ratio may be equal to or greater than two, for example, if the AC power supply (12) outputs a single-phase alternating current.

The reactor (24) and the small-capacitance capacitor (26) form an LC filter. The inductance of the reactor (24) and the capacitance of the small-capacitance capacitor (26) are set so as to allow this filter to attenuate a current component having the same frequency as a carrier for use to generate a control signal for the inverter (28). This thus prevents such a current component having the same frequency as the carrier from flowing out into the AC power supply (12).

The inverter (28) has three legs, each of which includes two switching elements that are connected together in series. In each leg, the node at which a switching element (Su1, Sv1, or Sw1) of the upper arm and an associated switching element (Su2, Sv2, or Sw2) of the lower arm are connected together is connected to a coil of the corresponding phase in the motor (16). Also, a freewheeling diode is connected anti-parallel to each of these switching elements (Su1, Sv1, Sw1, Su2, Sv2, Sw2). By turning these switching elements (Su1, Sv1, Sw1, Su2, Sv2, Sw2) ON and OFF, the inverter (28) converts the input voltage into a three-phase AC voltage, and supplies that voltage to the motor (16).

Using a carrier with a predetermined frequency (of about 5 kHz, for example), the conversion controller (29) generates a control signal (Smd) that operates the switching elements (Su1, Sv1, Sw1, Su2, Sv2, Sw2) such that the motor (16) rotates at a desired velocity. Then, the conversion controller (29) outputs the control signal (Smd) to the switching elements (Su1, Sv1, Sw1, Su2, Sv2, Sw2). The control signal (Smd) includes six signals to be applied to the respective control electrodes of these switching elements (Su1, Sv1, Sw1, Su2, Sv2, Sw2). In this case, the conversion controller (29) controls switching of the inverter (28) such that the currents in respective phases flowing through the motor (16) pulsate synchronously with the pulsation of the voltage of the AC power supply (12). The conversion controller (29) also outputs the period of rotation (Tm) of the motor (16) to a compensation controller (60).

—Current Compensator—

The current compensator (40) will be described next. The current compensator (40) shown in FIG. 1 includes a transformer (42), filters (44) for respective phases, reactors (48) for respective phases, a compensation current generator (52), a current compensating capacitor (54), a drive signal generator (56), and the compensation controller (60). The compensation controller (60) includes a phase calculator (62), dq transformers (64, 66), a high-pass filter (71), an adder (72), a subtractor (73), a proportional integral (PI) controller (74), an active current controller (76), and a reactive current controller (78).

The compensation currents (Icr, Ics, Ict) are input to the compensation current generator (52) via the filters (44) and the reactors (48). The current compensator (40) provides a filter (44) and a reactor (48) for each of the three phases. Each filter (44) filters out the high-frequency component of an associated compensation current (Icr, Ics, or Ict) (i.e., the current component produced by switching in the compensation current generator (52)). The compensation current generator (52) performs a switching operation in accordance with a drive signal (Scd) generated by the drive signal generator (56), thereby controlling the current flowing between the AC power supply (12) and the compensation current generator (52). The transformer (42) transforms a voltage in one phase among the outputs of the AC power supply (12), and outputs the voltage as a zero-cross signal (Scr) to the phase calculator (62).

The compensation controller (60) obtains output voltage instruction values (Vid, Viq) and outputs them to the drive signal generator (56). The output voltage instruction values (Vid, Viq) include an active voltage instruction value (Vid) and a reactive voltage instruction value (Viq).

The compensation controller (60) obtains an active voltage instruction value (Vid) such that the active component of the compensation currents (Icr, Ics, Ict) cancels the harmonic component (high-frequency component) of the load currents (Ir, Is, It) resulting from the rotation of the motor (16). More specifically, the compensation controller (60) obtains an active voltage instruction value (Vid) such that the active component of the compensation currents (Icr, Ics, Ict) cancels the harmonic component (high-frequency component) of the active component of the load currents (Ir, Is, It). The compensation controller (60) also obtains a reactive voltage instruction value (Viq) such that the reactive component of the compensation currents (Icr, Ics, Ict) cancels the harmonic component of the load currents (Ir, Is, It) (e.g., components of which the frequency is six times as high as the power supply frequency) dependent on a period (Ts) of the voltage of the AC power supply (12). More specifically, the compensation controller (60) obtains a reactive voltage instruction value (Viq) such that the reactive component of the compensation currents (Icr, Ics, Ict) cancels the reactive component of the load currents (Ir, Is, It).

The phase calculator (62) detects the phase ($\omega \cdot ts$) of the supply voltage based on the zero-cross signal (Scr) and outputs the phase to the dq transformers (64, 66). A current transformer (14) outputs currents (ir, it) which are respectively proportional to two phase currents (Ir, It) among the load currents (Ir, Is, It) to the dq transformer (64). Likewise, a current transformer (46) outputs currents (icr, ict) which are respectively proportional to currents (Icr, Ict) in two phases among the compensation currents (Icr, Ics, Ict) to the dq transformer (66).

The dq transformer (64) performs three phase to two phase transformation on the currents (ir, it). Note that the other phase current may be obtained based on these currents (ir, it). The dq transformer (64) outputs a d-axis component thus obtained to the high-pass filter (71) and a q-axis component (iq*) thus obtained to the reactive current controller (78), respectively.

The dq transformer (66) performs three phase to two phase transformation on the currents (icr, ict). Note that the other phase current may be obtained based on these currents (icr, ict). The dq transformer (66) outputs a d-axis component (id) thus obtained to the active current controller (76) and a q-axis component (iq) thus obtained to the reactive current controller (78), respectively. The high-pass filter (71) outputs the high-frequency component (imot) of the d-axis component obtained by the dq transformer (64). As used herein, the d-axis and q-axis are the axes of coordinates of a rotational coordinate system synchronized with the phase ($\omega \cdot ts$) of the supply voltage detected by the phase calculator (62). Specifically, the d-axis component indicates an active component, and the q-axis component indicates a reactive component.

The high-frequency component (imot) is that of the active component of the load currents (Ir, Is, It) which have been transformed to two phase currents. The d-axis component (id) is an active component of the compensation currents (Icr, Ics, Ict) which have been transformed to two phase currents. The q-axis component (iq*) is a reactive component of the load currents (Ir, Is, It) which have been transformed to two phase currents. The q-axis component (iq) is a reactive component of the compensation currents (Icr, Ics, Ict) which have been transformed to two phase currents.

The subtractor (73) subtracts the voltage (Vdc) of the current compensating capacitor (54) from its instruction value (Vdc*) and outputs a result of the subtraction. The PI controller (74) adds together a value proportional to the result of the subtraction and an integral of the results of the subtractions, thereby obtaining a voltage correction value (Vcn). However, the PI controller (74) does not always have to obtain the integral term but only needs to obtain and output at least the proportional term. The adder (72) adds the voltage correction value (Vcn) to the high-frequency component (imot) of the d-axis component, and outputs the result of the addition as a d-axis component (id*) to the active current controller (76).

The active current controller (76) generates an active voltage instruction value (Vid) such that the d-axis component (id) cancels the d-axis component (id*), and outputs the active voltage instruction value (Vid) to the drive signal generator (56). The active voltage controller (76) obtains the active voltage instruction value (Vid) based on the period of rotation (Tm) of the motor (16).

The reactive current controller (78) generates a reactive voltage instruction value (Viq) such that the q-axis component (iq) cancels the q-axis component (iq*), and outputs the reactive voltage instruction value (Viq) to the drive signal generator (56). The reactive voltage controller (78) obtains the reactive voltage instruction value (Viq) based on the period (Ts) of the voltage of the AC power supply (12).

Optionally, the compensation controller (60) may further include another high-pass filter which outputs a high-frequency component (iqh*) of the q-axis component (iq*) that has been obtained by the dq transformer (64). In that case, the reactive current controller (78) uses the high-frequency component (iqh*) of the q-axis component (iq*), instead of the q-axis component (iq*).

Figure 3:
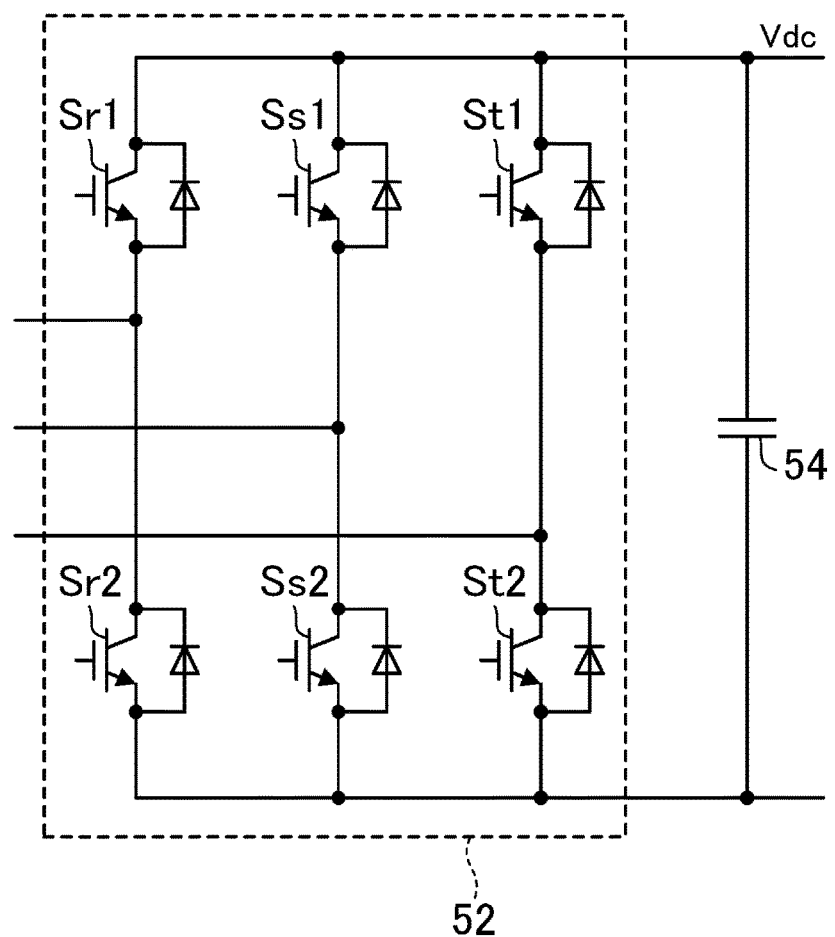
FIG. 3 is a circuit diagram illustrating an exemplary configuration for the compensation current generator shown in FIG. 1.

FIG. 3 is a circuit diagram illustrating an exemplary configuration for the compensation current generator (52) shown in FIG. 1. The compensation current generator (52) has three legs, each of which includes two switching elements that are connected together in series. In each leg, the node at which a switching element (Sr1, Ss1, or St1) of the upper arm and an associated switching element (Sr2, Ss2, or St2) of the lower arm are connected together is connected to a reactor (48) of the corresponding phase. Also, a freewheeling diode is connected anti-parallel to each of these switching elements (St1, Ss1, St1, Sr2, Ss2, St2). By turning these switching elements (Sr1, Ss1, St1, Sr2, Ss2, St2) ON and OFF in accordance with the drive signal (Scd), the compensation current generator (52) controls the compensation currents (Icr, Ics, Ict) flowing between itself (52) and the AC power supply (12).

The drive signal generator (56) may obtain phase voltage instruction values (Vu*, Vv*, Vw*) by, for example, the following equations:

$$Vu^* = \sqrt{(2/3)}(\cos\theta e \times Vid - \sin\theta e \times Viq)$$

$$Vv^* = \sqrt{(2/3)}(\cos(\theta e - 2\pi/3) \times Vid - \sin(\theta e - 2\pi/3) \times Viq)$$

$$Vw^* = \sqrt{(2/3)}(\cos(\theta e + 2\pi/3) \times Vid - \sin(\theta e + 2\pi/3) \times Viq)$$

The drive signal generator (56) generates the drive signal (Scd) based on these phase voltage instruction values (Vu*, Vv*, Vw*), and then outputs the drive signal (Scd) to the compensation current generator (52).

Figure 4:
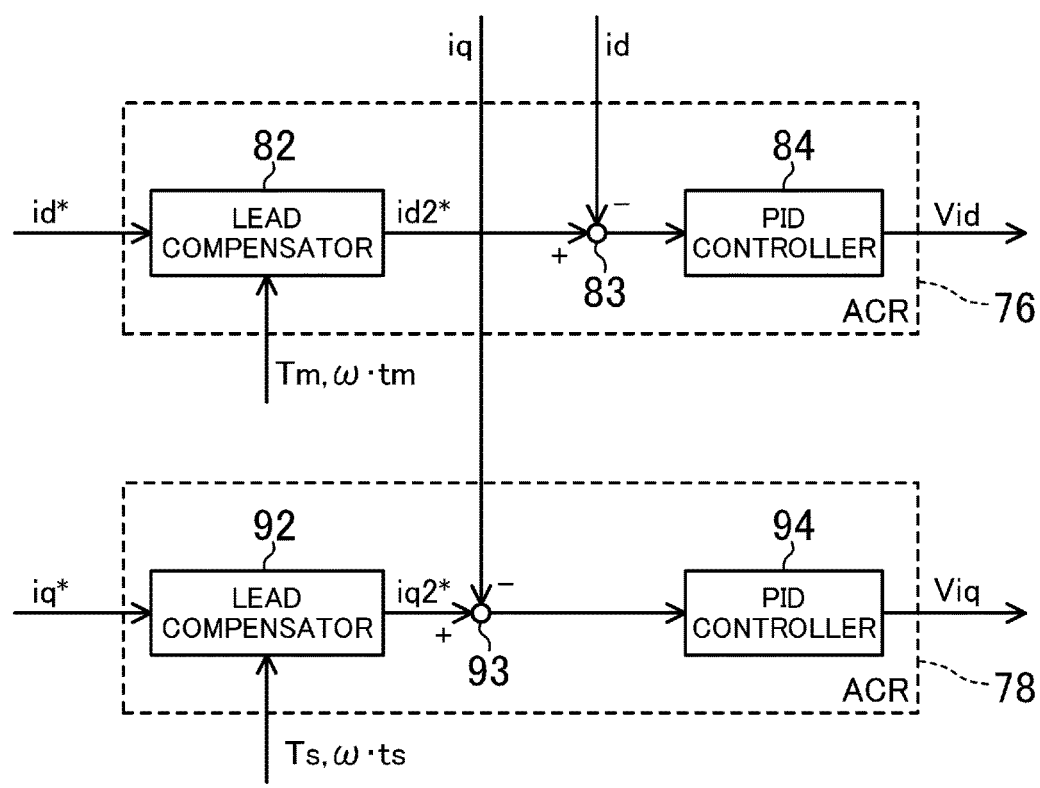
FIG. 4 is a block diagram illustrating a specific example of the active current controller and reactive current controller shown in FIG. 1.

FIG. 4 is a block diagram illustrating a specific example of the active current controller (76) and reactive current controller (78) shown in FIG. 1. The active current controller (76) includes a lead compensator (82), a subtractor (83), and a proportional-integral-differential (PID) controller (84) functioning as a first calculator. The reactive current controller (78) includes a lead compensator (92), a subtractor (93), and a PID controller (94) functioning as a second calculator.

To compensate for the time delay (ta) caused by the current compensator (40), the lead compensator (82) delays the d-axis component (id*) for a period of time corresponding to one period of rotation (Tm) of the motor (16), thereby adding an apparent phase lead to the d-axis component (id*) resulting from the addition. Specifically, the lead compensator (82) memorizes the waveform of the d-axis component (id*) that is the result of addition obtained by the adder (72), and delays the d-axis component (id*) for a period of time corresponding to one period of rotation (Tm) of the motor (16), i.e., by the amount of time $$Tm - Ta$$

in order to compensate for the time delay (ta). Since the waveform is a repetition of similar waveform patterns in a steady state, it appears as if the lead compensator (82) added a phase lead to the d-axis component (id*) by $$\varphi a = 2\pi \cdot ta/Tm$$

Furthermore, in view of the rotation phase (ω·tm) of the motor (16), the lead compensator (82) outputs the delayed d-axis component as a d-axis component (id2*).

The time delay (ta) may be the amount of time that it takes for the compensation currents (Icr, Ics, Ict) to start to change by having the switching elements of the compensation current generator (52) driven by the compensation controller (60), for example, since the load currents (Ir, It) were detected by the current transformer (14). This time delay includes the detection delay caused by the current transformer (14) and the delay caused by the high-pass filter (71).

The subtractor (83) calculates and outputs the difference (ad) between the two d-axis components (id2*, id). The PID controller (84) calculates the sum of the proportional, integral and differential terms with respect to the difference (ad) obtained by the subtractor (83), and outputs the sum as the active voltage instruction value (Vid). In this case, the proportional term is the product of a proportional coefficient (kpd) and the difference (ad), the integral term is the product of an integral coefficient (kid) and the result of integration of the differences (ad), and the differential term is the product of a differential coefficient (kdd) and the result of differentiation of the difference (ad). However, the PID controller (84) does not always have to calculate the integral term or the differential term, but only needs to calculate and output at least the proportional term.

To compensate for the time delay (tb) caused by the current compensator (40), the lead compensator (92) delays the q-axis component (iq*) for a period of time corresponding to one period (Ts) of the voltage of the AC power supply (12), thereby adding an apparent phase lead to the q-axis component (iq*) constituting the reactive component of the load currents. Specifically, the lead compensator (92) memorizes the waveform of the q-axis component (iq*) that is the reactive component of the load currents, and delays the q-axis component (iq*) for a period of time corresponding to one period (Ts) of voltage of the AC power supply (12), i.e., by the amount of time $$Ts - tb$$

in order to compensate for the time delay (tb). Since its waveform is a repetition of similar waveform patterns in a steady state, it appears as if the lead compensator (92) added a phase lead to the q-axis component (iq*) by $$\varphi b = 2\pi \cdot tb/Ts$$

Furthermore, in view of the phase (ω·ts) of the supply voltage, the lead compensator (92) outputs the delayed q-axis component as a q-axis component (iq2*).

The subtractor (93) calculates and outputs the difference (aq) between the two q-axis components (iq2*, iq). The PID controller (94) calculates the sum of the proportional, integral and differential terms with respect to the difference (aq) obtained by the subtractor (93), and outputs the sum as the reactive voltage instruction value (Viq). In this case, the proportional term is the product of a proportional coefficient (kpq) and the difference (aq), the integral term is the product of an integral coefficient (kiq) and the result of integration of the differences (aq), and the differential term is the product of a differential coefficient (kdq) and the result of differentiation of the difference (aq). However, the PID controller (94) does not always have to calculate the integral term or the differential term, but only needs to calculate and output at least the proportional term.

Figure 5:
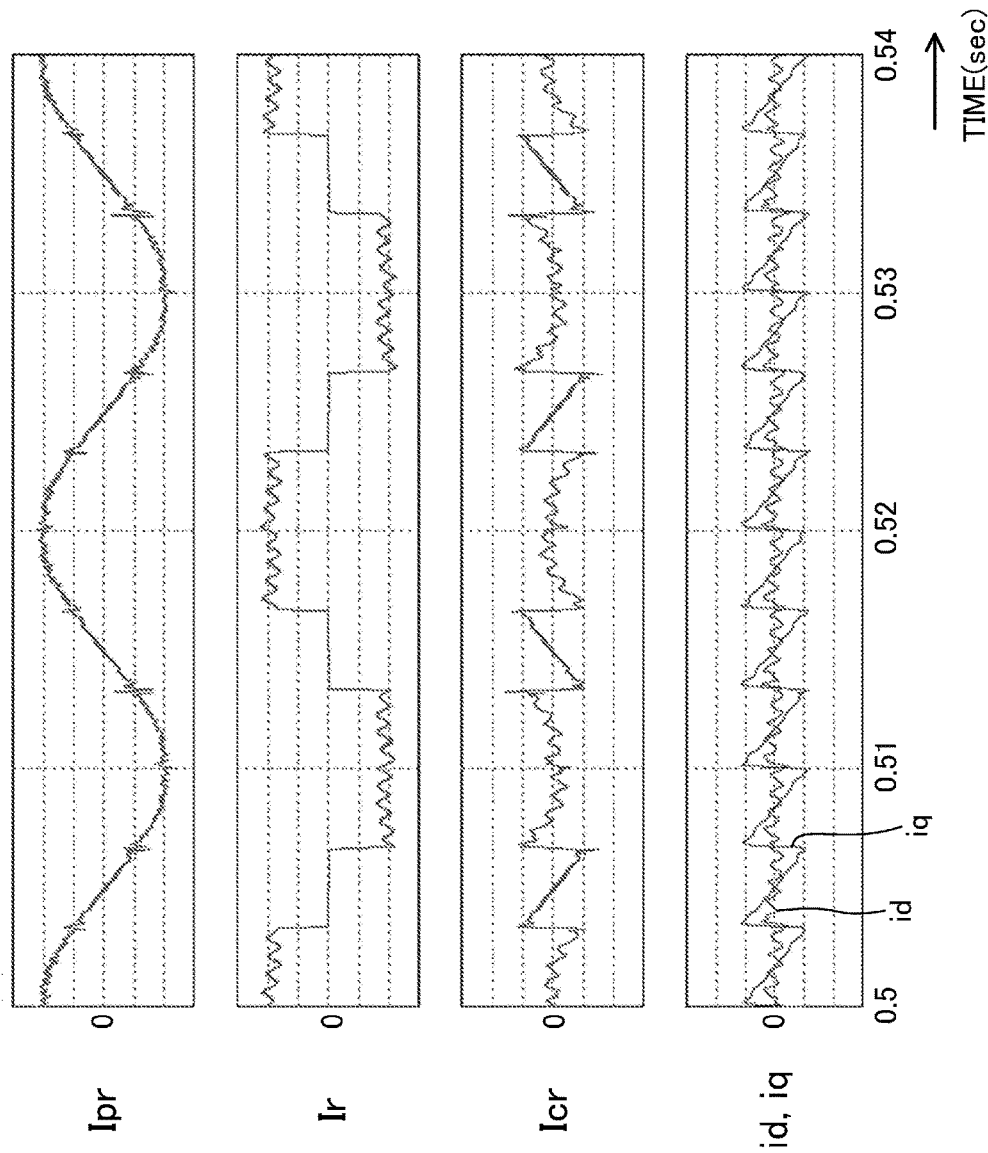
FIG. 5 is a graph showing exemplary current waveforms in the power converter device shown in FIG. 1.
Figure 6:
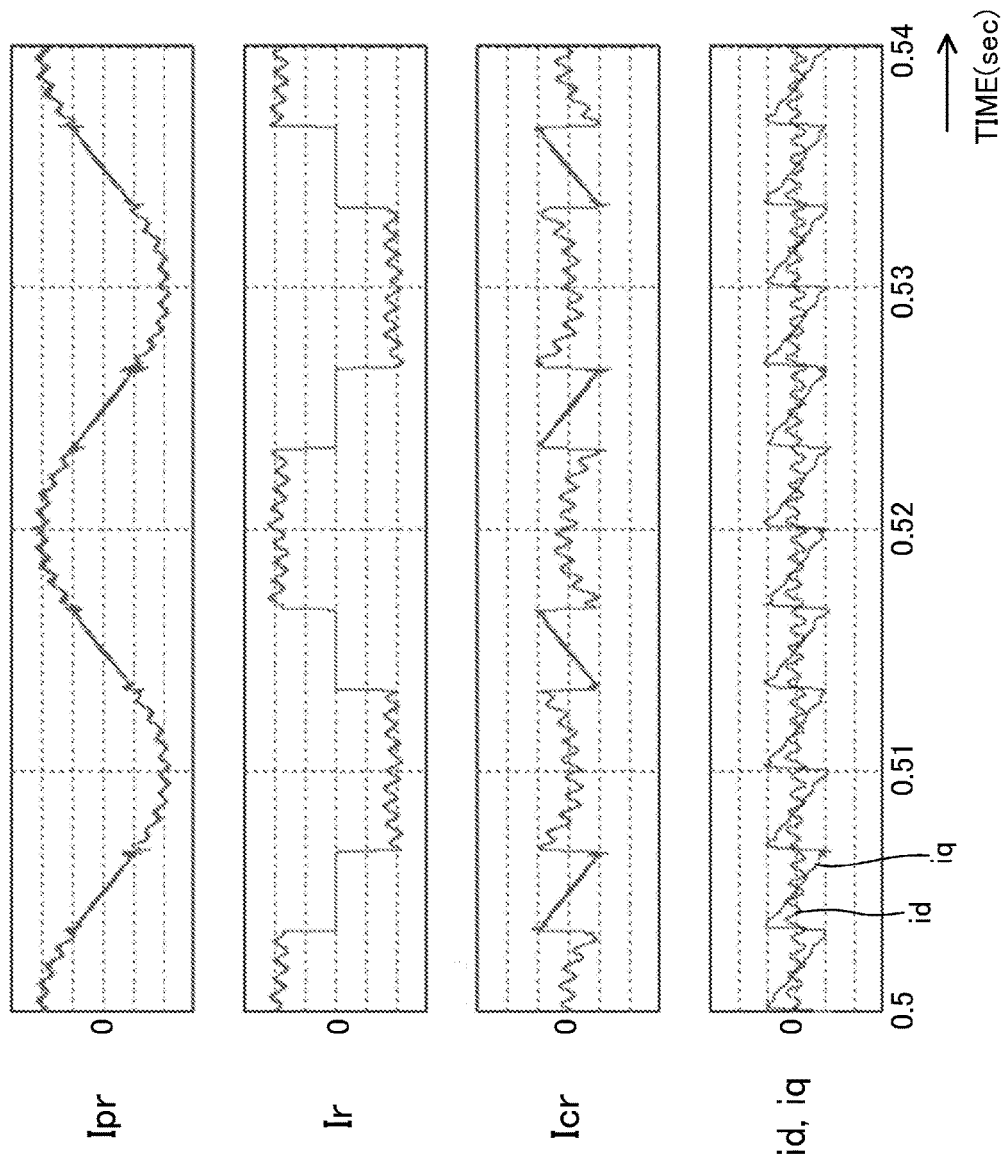
FIG. 6 is a graph showing exemplary current waveforms in a conventional power converter device.

FIG. 5 is a graph showing exemplary current waveforms in the power converter device (100) shown in FIG. 1. In FIG. 5, shown are the waveforms of a supply current (Ipr), a load current (ir), a compensation current (icr), the d-axis component (id), and the q-axis component (iq). FIG. 6 is a graph showing exemplary current waveforms in a conventional power converter device. In this power converter device, the compensation controller (60) obtains the active voltage instruction value (Vid) based on the period (Ts) of the voltage of the AC power supply (12). Comparing the results shown in FIGS. 5 and 6 to each other, it can be seen that the harmonics having a higher frequency than the frequency (of 50 Hz in this example) of the supply current (Ipr) and resulting from the rotation of the motor (16) are reduced in the supply current (Ipr) in FIG. 5.

As can be seen from the foregoing description, in the power converter device (100) of this embodiment shown in FIG. 1, the compensation controller (60) obtains an active voltage instruction value (Vid) such that the active component of the compensation currents (Icr, Ics, Ict) cancels the harmonic component of the load currents (Ir, Is, It) resulting from the rotation of the motor (16), and also obtains a reactive voltage instruction value (Viq) such that the reactive component of the compensation currents (Icr, Ics, Ict) cancels the harmonic component, of the load currents (Ir, Is, It), dependent on the period (Ts) of the voltage of the AC power supply (12). Also, the compensation controller (60) obtains the active voltage instruction value (Vid) based on the period of rotation (Tm) of the motor (16), not the period (Ts) of the voltage of the AC power supply (12). Thus, the harmonics caused in the supply current by rotating the motor (16) may be reduced.

In particular, in a power converter device which uses only a capacitor with a relatively small capacitance (and which does not include any electrolytic capacitor, for example) such that the DC voltage output from a rectifier has pulsation corresponding to the power supply frequency, the harmonics in the supply current may be reduced. As a result, such a power converter device may also be brought into conformity with regulations that are defined in various countries about harmonics in a supply current. Since the harmonics may be reduced, the capacitance of the capacitor and the reactance of the reactor in the power converter may be further reduced.

The active component of the compensation currents (Icr, Ics, Ict) generated by the current compensator (40) is a harmonic component resulting from the rotation of the motor. Thus, a capacitor with a relatively small capacitance may be used as the current compensating capacitor (54), and there is no need to use an electrolytic capacitor functioning as an energy storage element as the current compensating capacitor (54).

The active current controller (76) delays the result of addition (id*) for a period of time corresponding to one period of rotation (Tm) of the motor (16), thereby adding an apparent phase lead to the result of addition (id*) of which the waveform is a repetition of similar waveform patterns in a steady state. Also, the reactive current controller (78) delays the reactive component (iq*) of the load currents for a period of time corresponding to one period (Ts) of the voltage of the AC power supply (12), thereby adding an apparent phase lead to the reactive component (iq*) of the load currents of which the waveform is a repetition of similar waveform patterns in a steady state. Thus, the influence of the delay to be caused in the current compensator (40) may be reduced.

Figure 7:
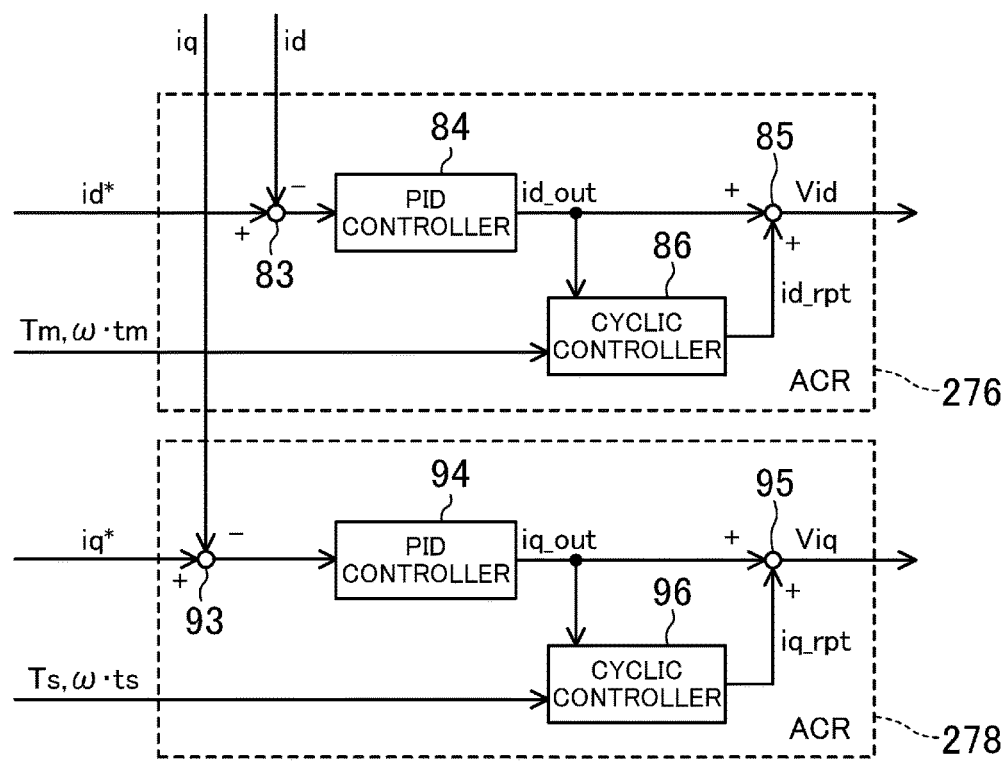
FIG. 7 is a block diagram illustrating another example of the active current controller and reactive current controller shown in FIG. 1.

FIG. 7 is a block diagram illustrating another example of the active current controller (76) and reactive current controller (78) shown in FIG. 1. The active current controller (276) includes the subtractor (83), the PID controller (84), and a cyclic controller (86). The reactive current controller (278) includes the subtractor (93), the PID controller (94), and a cyclic controller (96).

The subtractor (83) calculates and outputs the difference (ad2) between the d-axis component (id*) that is the result of addition obtained by the adder (72) and the d-axis component (id) that is the active component of the compensation currents. Just like the PID controller (84) shown in FIG. 4, the PID controller (84) also calculates the sum of the proportional, integral and differential terms with respect to the difference (ad2) obtained by the subtractor (83), and outputs the sum as a control value (id_out). The cyclic controller (86) accumulates over multiple periods, with respect to each of multiple sample points in one period of rotation (Tm) of the motor (16), a corresponding one of a plurality of control values (id_out) obtained by the PID controller (84), thereby outputting a result of the accumulation (id_rpt). The adder (85) calculates the sum of the control value (id_out) and the result of accumulation (id_rpt) and outputs the sum as an active voltage instruction value (Vid).

The subtractor (93) calculates and outputs the difference (aq2) between the q-axis component (iq*) that is the reactive component of the load currents and the q-axis component (iq) that is the reactive component of the compensation currents. Just like the PID controller (94) shown in FIG. 4, the PID controller (94) also calculates the sum of the proportional, integral and differential terms with respect to the difference (aq2) obtained by the subtractor (93), and outputs the sum as a control value (iq_out). The cyclic controller (96) accumulates over multiple periods, with respect to each of multiple sample points in one period of rotation (Ts) of the AC power supply (12), a corresponding one of a plurality of control values (iq_out) obtained by the PID controller (94), thereby outputting a result of the accumulation (iq_rpt). The adder (95) calculates the sum of the control value (iq_out) and the result of accumulation (iq_rpt) and outputs the sum as a reactive voltage instruction value (Viq).

Figure 8:
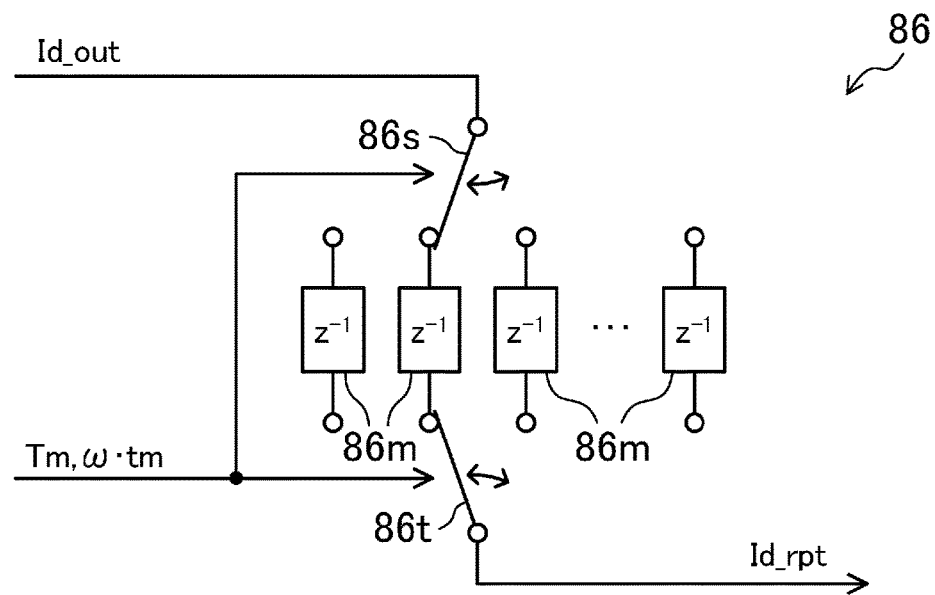
FIG. 8 is a block diagram illustrating an exemplary configuration for the cyclic controller shown in FIG. 7.

FIG. 8 is a block diagram illustrating an exemplary configuration for the cyclic controller (86) shown in FIG. 7. The cyclic controller (86) shown in FIG. 8 includes N storage sections (86m) and two switches (86s, 86t). The switch (86s) sequentially selects one of the N storage sections (86m) after another in accordance with the phase of rotation (ω·tm) of the motor (16) such that one round of selection is completed in one period of rotation (Tm) of the motor (16). These storage sections (86m) are associated with their respective phases, each pair of which are different from each other by 2π/N. Thus, a control value (id_out) in a corresponding phase is input every time to each storage section (86m). Each storage section (86m) calculates an accumulated value by adding the control value (id_out) obtained by the current sampling process to the value that has been stored by the time of the previous sampling process, and stores and outputs the accumulated value thus calculated.

The switch (86t) selects one of the N storage sections (86m) and passes its output as the result of accumulation (id_rpt). The switch (86t) selects the storage section (86m) a few samples earlier than the switch (86s). In this manner, the time delay (ta) caused by the control and other operations may be compensated for.

In this example, N indicates the number of times the sampling process is repeatedly performed in one period of rotation (Tm) of the motor (16). By repeatedly performing these operations, the cyclic controller (86) calculates, with respect to each of the multiple sample points, the result of accumulation (id_rpt) by accumulating over multiple periods a corresponding one of the control values (id_out). The cyclic controller (96) shown in FIG. 7 is also configured in the same way as the cyclic controller (86). In the cyclic controller (96), however, N indicates the number of times the sampling process is repeatedly performed in one period (Ts) of the voltage of the AC power supply (12). Also, the switch (86s) sequentially selects one of the N storage sections (86m) after another in accordance with the phase (ω·ts) of the voltage of the AC power supply (12) such that one round of selection is completed in one period (Ts) of the voltage of the AC power supply (12).

Figure 9:
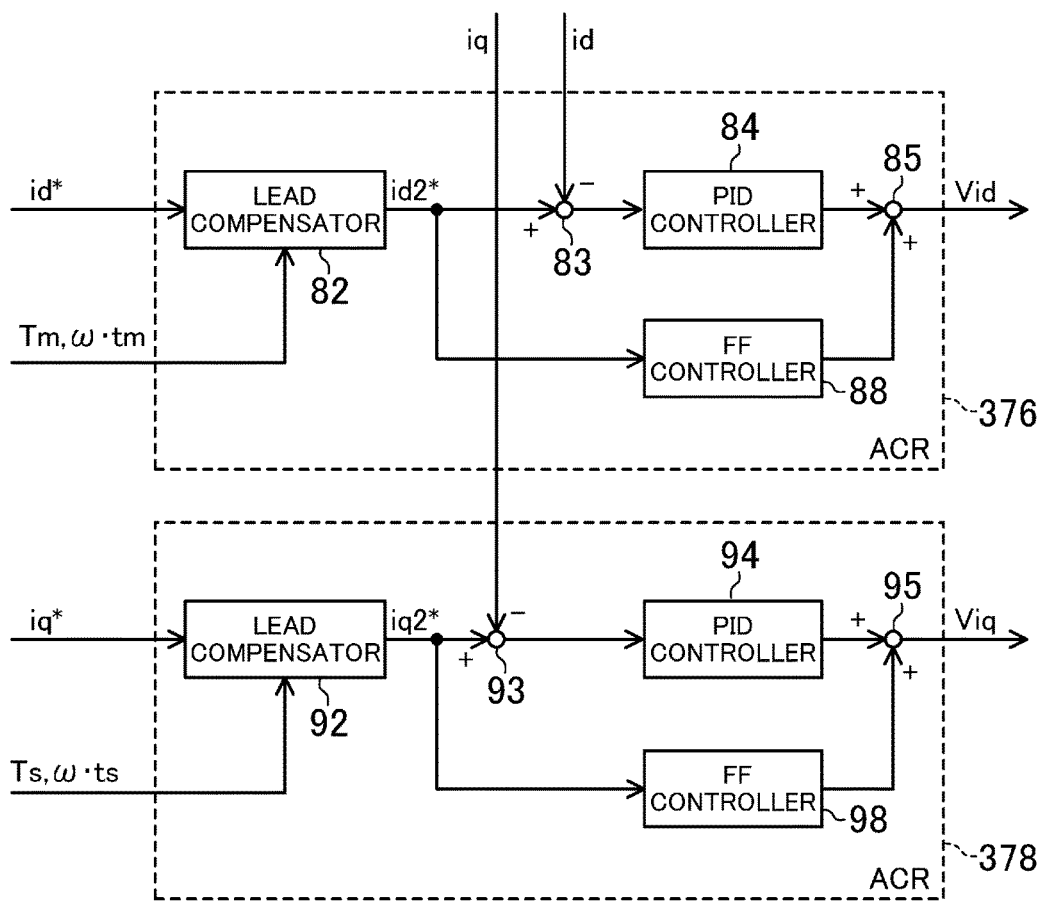
FIG. 9 is a block diagram illustrating still another example of the active current controller and reactive current controller shown in FIG. 1.

FIG. 9 is a block diagram illustrating still another example of the active current controller (76) and reactive current controller (78) shown in FIG. 1. The active current controller (376) includes the lead compensator (82), the subtractor (83), the PID controller (84), the adder (85), and a feed forward controller (88). The reactive current controller (378) includes the lead compensator (92), the subtractor (93), the PID controller (94), the adder (95), and a feed forward controller (98). The lead compensators (82, 92), the subtractors (83, 93), and the PID controllers (84, 94) are the same as what has already been described with reference to FIG. 4, and description thereof will be omitted herein.

The feed forward controller (88) applies an inverse model of the current compensator (40) to the result of addition (id2*) that has been delayed by the lead compensator (82). Specifically, for example, the feed forward controller (88) may calculate the differential of the result of addition (id2*) that has been delayed by the lead compensator (82) and then multiply the result of differentiation by a constant L, where the constant L is either the reactance of the reactor (48) or the reactance of the filter (44) and reactor (48). The adder (85) adds together the sum obtained by the PID controller (84) and the value obtained by the feed forward controller (88), and outputs the sum thus obtained as the active voltage instruction value (Vid).

The feed forward controller (98) applies an inverse model of the current compensator (40) to the result of addition (iq2*) that has been delayed by the lead compensator (92). That is to say, the feed forward controller (98) may perform, on the result of addition (iq2*) that has been delayed by the lead compensator (92), the same arithmetic operation as what is performed by the feed forward controller (88). The adder (95) adds together the sum obtained by the PID controller (94) and the value obtained by the feed forward controller (98), and outputs the sum thus obtained as the reactive voltage instruction value (Viq).

Figure 10:
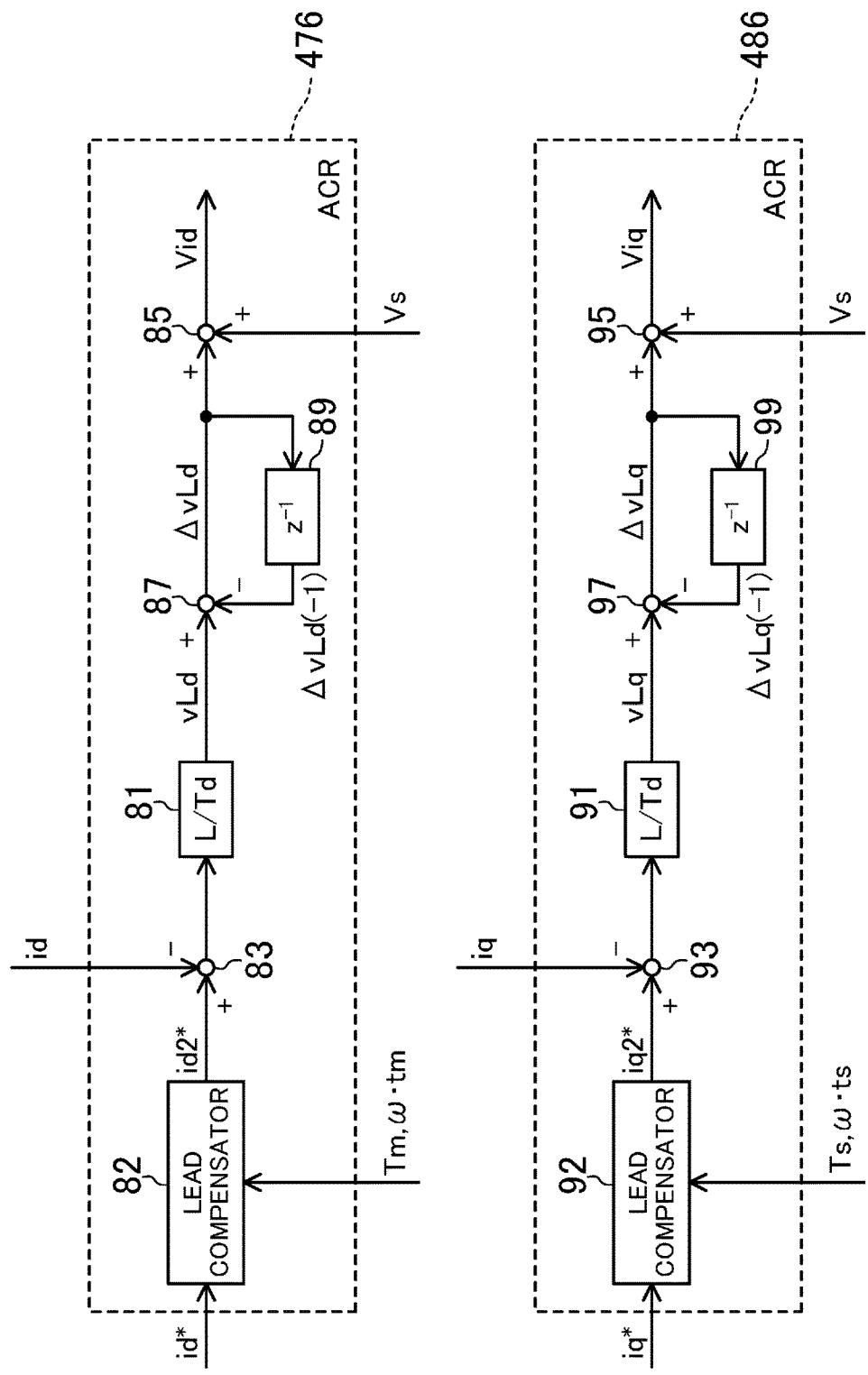
FIG. 10 is a block diagram illustrating yet another example of the active current controller and reactive current controller shown in FIG. 1.

FIG. 10 is a block diagram illustrating yet another example of the active current controller and reactive current controller shown in FIG. 1. The active current controller (476) shown in FIG. 10 includes the lead compensator (82), subtractors (83, 87), a voltage calculator (81), a storage section (89), and the adder (85). The reactive current controller (478) includes the lead compensator (92), subtractors (93, 97), a voltage calculator (91), a storage section (99), and the adder (95). The lead compensators (82, 92) and the subtractors (83, 93) are the same as what has already been described with reference to FIG. 4, and description thereof will be omitted herein.

The voltage calculator (81) calculates, based on the difference (id2*−id) obtained by the subtractor (83), a reactor voltage (vLd) using the value of the reactor (48) and a control (sampling) interval (Td) by the following equation:

$$vLd = L/Td(id2^* - id)$$

The storage section (89) receives the magnitude of variation (ΔvLd) in the reactor voltage at the current sampling time. The storage section (89) stores this input value and outputs the value after having delayed it for one sample period. The subtractor (87) calculates the difference between the reactor voltage (vLd) and the output of the storage section (89) as the magnitude of variation (ΔvLd) in reactor voltage this time, and outputs the difference to the storage section (89) to have it stored in the storage section (89). The output of the storage section (89) is the magnitude of variation ΔvLd(−1) in reactor voltage last time (i.e., one sample period ago). The adder (85) calculates and outputs the sum of the magnitude of variation (ΔvLd) in reactor voltage this time that has been obtained by the subtractor (87) and the voltage (Vs) of the AC power supply (12) as the active voltage instruction value (Vid). The sampling interval (Td) is the interval for use in the entire compensation controller (60), and may be one period of a carrier for generating a control signal for the switching elements.

The voltage calculator (91) calculates, based on the difference (iq2*−iq) obtained by the subtractor (93), a reactor voltage (vLq) using the value of the reactor (48) and the control (sampling) interval (Td) by the following equation:

$$vLq = L/Td(iq2^* - iq)$$

The storage section (99) receives the magnitude of variation (ΔvLq) in reactor voltage at the current sampling time. The storage section (99) stores this input value and outputs the value after having delayed it for one sample period. The subtractor (97) calculates the difference between the reactor voltage (vLq) and the output of the storage section (99) as the magnitude of variation (ΔvLq) in reactor voltage this time, and outputs the difference to the storage section (99) to have it stored in the storage section (99). The output of the storage section (99) is the magnitude of variation ΔvLq(−1) in reactor voltage last time (i.e., one sample period ago). The adder (95) calculates and outputs the sum of the magnitude of variation (ΔvLq) in reactor voltage this time that has been obtained by the subtractor (97) and the voltage (Vs) of the AC power supply (12) as the reactive voltage instruction value (Viq).

Figure 11:
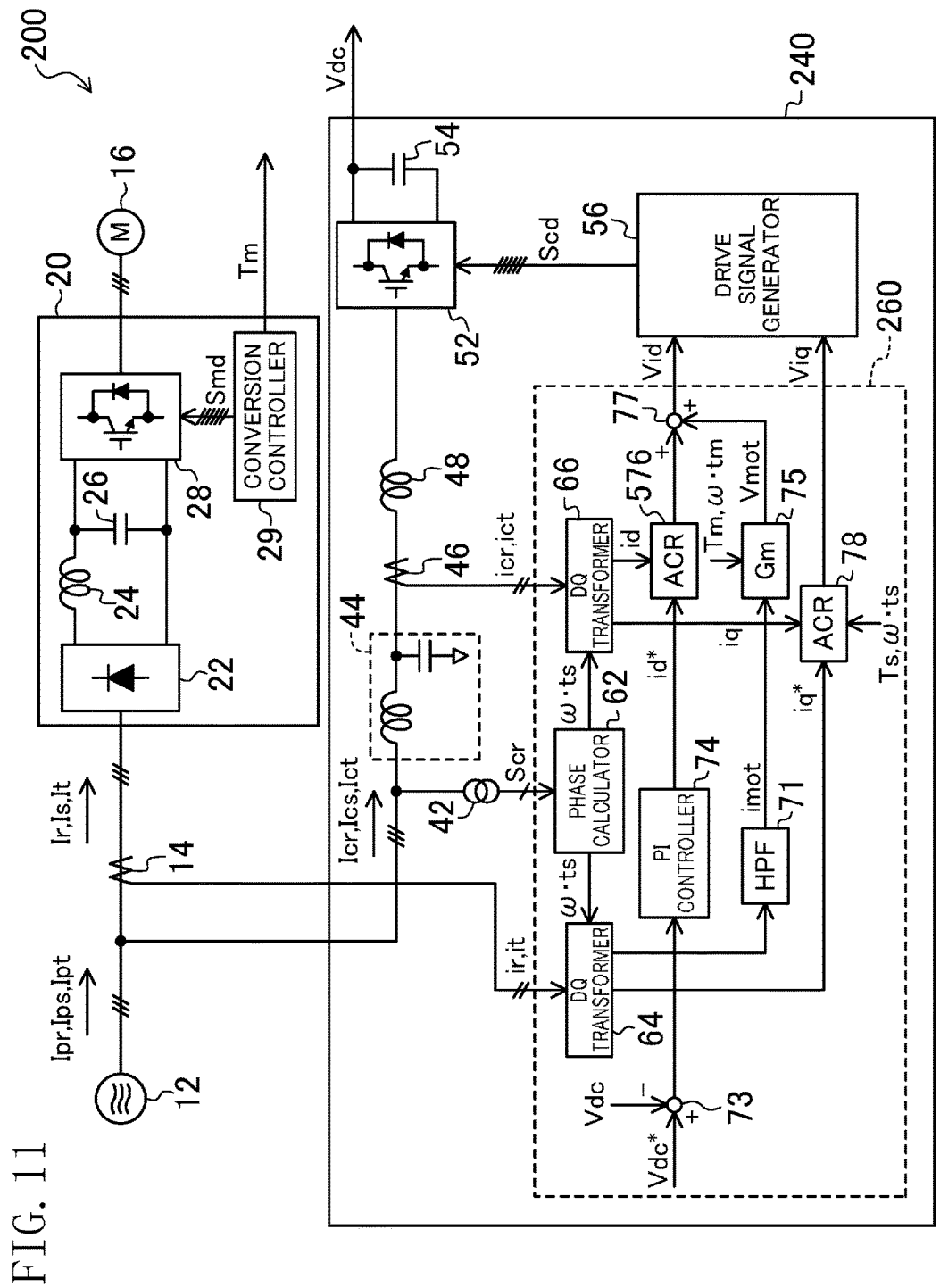
FIG. 11 is a block diagram illustrating an exemplary configuration for a variation of a power converter device according to an embodiment of the present invention.

FIG. 11 is a block diagram illustrating an exemplary configuration for a variation of the power converter device (100) according to an embodiment of the present invention. The power converter device (200) shown in FIG. 11 includes a current compensator (240) instead of the current compensator (40), which is a major difference from the power converter device (100). The current compensator (240) includes a compensation controller (260) instead of the compensation controller (60), which is a difference from the current compensator (40), but has the same configuration as the current compensator (40) in the other respects.

The compensation controller (260) further includes a delay controller (75), includes an adder (77) instead of the adder (72) and an active current controller (576) instead of the active current controller (76), respectively, but has the same configuration as the compensation controller (60) in the other respects. The phase calculator (62), dq transformers (64, 66), high-pass filter (71), adder (72), subtractor (73), PI controller (74), and reactive current controller (78) of the compensation controller (260) are the same as their counterparts of the compensation controller (60), and description thereof will be omitted herein.

The active current controller (576) includes every element of the active current controller (76) shown in FIG. 4 but the lead compensator (82). The active current controller (576) calculates and outputs a value to obtain the active voltage instruction value (Vid) such that the d-axis component (id) cancels the voltage correction value (id*) obtained by the PI controller (74).

The delay controller (75) calculates and outputs a delay-compensated high-frequency component (Vmot) by compensating for the delay of the high-frequency component (imot) that has been output from the high-pass filter (71), for example. More specifically, the delay controller (75) includes the lead compensator (82) of the active current controller (76) shown in FIG. 4 and a multiplier. The lead compensator (82) delays the d-axis component (id*) for a period of time corresponding to one period of rotation (Tm) of the motor (16), thereby adding an apparent phase lead to the high-frequency component (imot), as already described in detail with reference to FIG. 4. The multiplier multiplies, by a predetermined gain, the high-frequency component that has been delayed by the lead compensator (82), and outputs a delay-compensated high-frequency component (Vmot).

The adder (77) adds the value (Vmot) to the output value of the active current controller (76) and obtains the sum as the active voltage instruction value (Vid). In this case, the active current controller (76) obtains the value on the basis of one period of rotation (Tm) of the motor (16). The reactive current controller (78) may be what has already been described with reference to FIG. 4, for example. Optionally, the reactive current controller (78) may be replaced with the reactive current controller (278) shown in FIG. 7 or the reactive current controller (378) shown in FIG. 9.

By using the compensation controller (260) shown in FIG. 11, the phase lag of the high-frequency component (imot) may be compensated for, and the influence of the detection delay caused by the current transformer (14) and the waveform distortion caused by the high-pass filter (71) may be reduced.

Figure 12:
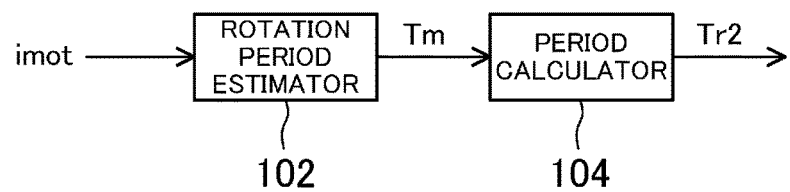
FIG. 12 is a block diagram illustrating blocks contributing to estimating one period of rotation.

FIG. 12 is a block diagram illustrating blocks contributing to estimating one period of rotation. The power converter device (100, 200) shown in FIG. 1 or 11 may further include the rotation period estimator (102) and period calculator (104) shown in FIG. 12.

The rotation period estimator (102) calculates one period of rotation (Tm) of the motor (16) based on the high-frequency component (imot), which has been obtained by the high-pass filter (71), of the active component of two phase currents transformed from the load currents (Ir, Is, It) with the number of pole pairs (p) of the motor (16) and the number of slots of the winding taken into account. The period calculator (104) calculates one period (Tr2) of the output voltage of the inverter (28) by the following equation:

$$Tr2=Tm/p$$

In this case, in the active current controller (76, 276, 376) and the reactive current controller (78, 278, 378), one period (Tr2) of the output voltage of the inverter (28) thus obtained may be used instead of one period of rotation (Tm) of the motor (16).

One period (Tr2) of the output voltage of the inverter (28) is shorter than one period of rotation (Tm) of the motor (16). Thus, the number of samples of data to be stored in the active current controller (76, 276, 376) and the reactive current controller (78, 278, 378), and eventually, the overall size of the device, may be reduced. Optionally, instead of the output value of the conversion controller (29), the value obtained by the rotation period estimator (102) may be used as one period of rotation (Tm) of the motor (16).

Figure 13:
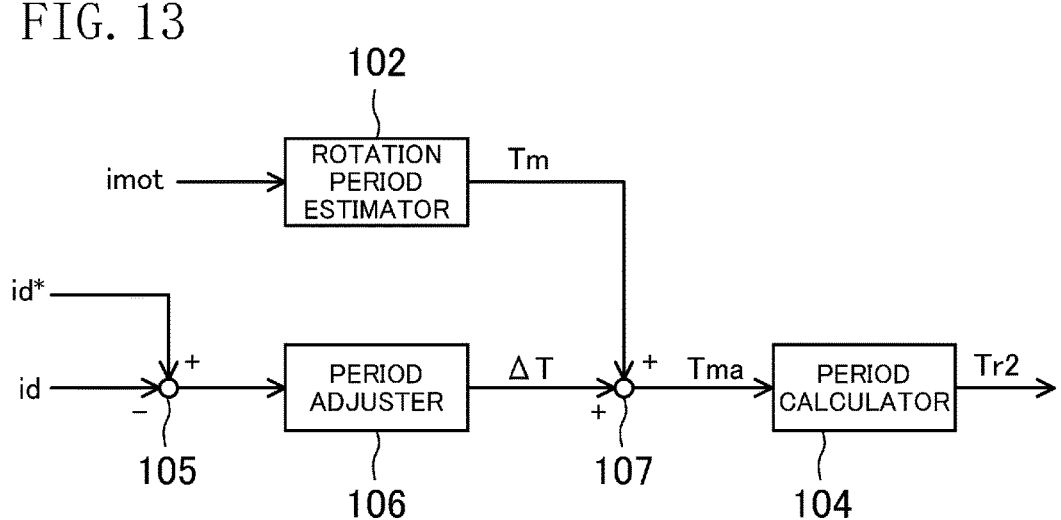
FIG. 13 is a block diagram illustrating blocks contributing to adjusting the period.

FIG. 13 is a block diagram illustrating blocks contributing to adjusting the period. The power converter device (100, 200) shown in FIG. 1 or 11 may further include the rotation period estimator (102), the period calculator (104), a subtractor (105), a period adjuster (106), and an adder (107) as shown in FIG. 13. The rotation period estimator (102) and period calculator (104) are the same as what has already been described with reference to FIG. 12.

The subtractor (105) subtracts the d-axis component (id) that is the active component of the compensation currents from the d-axis component (id*) supplied to the active current controller (76) and other elements, thereby outputting a result of subtraction. The period adjuster (106) calculates and outputs a control value ($\Delta T$) such that the result of subtraction becomes equal to zero. The adder (107) adds the control value ($\Delta T$) to the period of rotation (Tm) of the motor (16) that has been output from either the rotation period estimator (102) or the conversion controller (29), and outputs a result of addition (Tma). The period calculator (104) calculates and outputs one period (Tr2) of the output voltage of the inverter based on the result of addition (Tma). In this case, in the active current controller (76, 276, 376) and the reactive current controller (78, 278, 378), one period of rotation (Tm) of the motor (16) is replaced with the period (Tr2) thus obtained. Optionally, the result of addition (Tma) may be used as the period (Tr2) without using the period calculator (104).

Since the period for use in the control is adjusted such that the d-axis component (id*) agrees with the d-axis component (id) that is the active component of the compensation currents, the harmonic current may be compensated for with more reliability.

In FIGS. 1 and 11, the conversion controller (29) and the compensation controller (60) may be implemented as two independent controllers, or a single controller may function as the conversion controller (29) and the compensation controller (60). If a single controller operates as the conversion controller (29) and the compensation controller (60), there is no need to transmit data about one period of rotation (Tm) of the motor (16) and other data from the conversion controller (29) to the compensation controller (60). As a result, the time delay may be cut down significantly, and the harmonic current may be compensated for with more reliability.

In FIGS. 1 and 11, the switching elements that form the inverter (28) and the compensation current generator (52) may be implemented as insulated gate bipolar transistors (IGBTs), gate turn off thyristors (GTOs), or metal oxide semiconductor field-effect transistors (MOSFETs), for example. Optionally, wide-bandgap elements may be used as these switching elements. As used herein, the "wide-bandgap element" refers to an element having as wide a bandgap as approximately 2.2 eV or more. Examples of such elements include switching elements that use SiC, GaN, or diamond, for instance.

Compared to a device that uses silicon, a wide-bandgap element may have a significantly reduced resistance value, and therefore, contributes to cutting down the loss. In addition, since the switching rate may be increased, the size of the LC filter (24, 26, 44) may be cut down. Thus, a power converter device having a harmonic suppressing function may be downsized. Consequently, the ratio of such power converter devices with the harmonic suppressing function should increase so much that the harmonic interference of the power supply system would be reduced effectively. If a wide-bandgap element is used as the inverter (28), the size of the LC filter may be reduced, and therefore, the resonant frequency of the LC filter could rise so much that the harmonic attenuating effect by the motor could diminish.

However, since the current compensator (40) has the harmonic suppressing function, the harmonic interference of the power supply system may also be reduced.

Optionally, the inverter (28) and compensation current generator (52) may be allowed to perform a synchronous rectification operation using unipolar elements such as MOSFETs. By making those elements perform a synchronous rectification operation, the conduction loss may be reduced, and the freewheeling diodes connected to the switching elements may be omitted as well.

The functional blocks described herein are typically implementable by hardware. For example, the functional blocks may be formed on a semiconductor substrate as part of an integrated circuit (IC). The ICs as used herein include a large-scale integrated circuit (LSI), an application-specific integrated circuit (ASIC), a gate array, and a field programmable gate array (FPGA). Alternatively, some or all of the functional blocks may be implemented by software. For example, such a functional block may be implemented by a processor and a program executable on the processor. In other words, the functional blocks described herein may be implemented by hardware, by software, or by any combination of hardware and software The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

INDUSTRIAL APPLICABILITY

As can be seen from the foregoing description, the present invention is useful for power converter devices and other equipment.

DESCRIPTION OF REFERENCE CHARACTERS

12 AC Power Supply
16 Motor
20 Power Converter
22 Rectifier
26 Capacitor
28 Inverter
40 Current Compensator
48 Reactor
52 Compensation Current Generator
54 Current Compensating Capacitor
56 Drive Signal Generator
60, 260 Compensation Controller
75 Delay Controller
76, 276, 376, 476, 576 Active Current Controller
78, 278, 378, 478 Reactive Current Controller
100, 200 Power Converter Device

The invention claimed is:

1. A power converter device comprising:
a power converter configured to convert an alternating current supplied from an AC power supply to a direct current; and
a current compensator configured to control compensation currents (Icr, Ics, Ict) flowing between the AC power supply and the current compensator, wherein
the power converter includes:
a rectifier configured to rectify the alternating current supplied from the AC power supply and output pulsating direct current,
an inverter configured to convert the direct current into alternating currents to drive a motor; and
a capacitor connected between input nodes of the inverter;
the current compensator includes:
a current compensating capacitor;
a compensation current generator having an input connected to the AC power supply and an output connected to the current compensating capacitor, and performing a switching operation in accordance with a drive signal (Scd), thereby controlling the compensation currents (Icr, Ics, Ict) flowing between itself and the AC power supply;
a compensation controller configured to obtain output voltage instruction values (Vid, Viq) such that the compensation currents (Icr, Ics, Ict) cancel a harmonic component in load currents (Ir, Is, It) flowing from the AC power supply into the rectifier and resulting from rotation of the motor and a harmonic component in the load currents (Ir, Is, It) and dependent on a period (Ts) of a voltage of the AC power supply; and
a drive signal generator configured to generate the drive signal (Scd) based on the output voltage instruction values (Vid, Viq);
each of the supply currents (Ipr, Ips, Ipt) supplied from the AC power supply is the sum of an associated one of the load current (Ir, Is, It) and an associated one of the compensation currents (Icr, Ics, Ict;
the power converter device further comprises a reactor connected between an output node of the rectifier and one of the input nodes of the inverter;
an inductance of the reactor and a capacitance of the capacitor are set such that a filter formed by the reactor and the capacitance attenuates a current component having the same frequency as a carrier used for generating a control signal for the inverter;
the output voltage instruction values (Vid, Viq) include an active voltage instruction value (Vid) and a reactive voltage instruction value (Viq); and
the compensation controller obtains the active voltage instruction value (Vid) such that an active component of the compensation currents (Icr, Ics, Ict) cancels a harmonic component in the load currents (Ir, Is, It) flowing from the AC power supply into the rectifier and resulting from the rotation of the motor, and obtains the reactive voltage instruction value (Viq) such that a reactive component of the compensation currents (Icr, Ics, Ict) cancels a harmonic component in the load currents (Ir, Is, It) and dependent on the period (Ts) of the voltage of the AC power supply.

2. The power converter device of claim 1, wherein the compensation controller includes:
a high-pass filter configured to extract and output a high-frequency component (imot) from the active component of the load currents;
an adder configured to output a result of addition (id*) by adding a voltage correction value (Vcn), obtained based on a result of subtraction that has been calculated by subtracting a voltage (Vdc) of the current compensating capacitor from its instruction value (Vdc*), to an output of the high-pass filter;
an active current controller configured to obtain the active voltage instruction value (Vid) such that the active component (id) of the compensation currents cancels the result of addition (id*); and a reactive current controller configured to obtain the reactive voltage instruction value (Viq) such that the reactive component (iq) of the compensation currents cancels a reactive component (iq*) of the load currents.

3. The power converter device of claim 2, wherein the active current controller includes a first lead compensator configured to delay the result of addition (id*) for a period of time corresponding to one period of rotation (Tm) of the motor, thereby adding an apparent phase lead to the result of addition (id*), and obtains the active voltage instruction value (Vid) based on a result of addition (id2*) that has been delayed by the first lead compensator, and the reactive current controller includes a second lead compensator configured to delay the reactive component (iq*) of the load currents for a period of time corresponding to one period (Ts) of the voltage of the AC power supply, thereby adding an apparent phase lead to the reactive component (iq*) of the load currents, and obtains the reactive voltage instruction value (Viq) based on a reactive component (iq2*) of the load currents that has been delayed by the second lead compensator.

4. The power converter device of claim 3, wherein the active current controller further includes:
   a first subtractor configured to calculate the difference between the result of addition (id2*) delayed by the first lead compensator and the active component (id) of the compensation currents; and
   a first calculator configured to calculate, as the active voltage instruction value (Vid), at least a value proportional to the difference obtained by the first subtractor, and the reactive current controller further includes:
   a second subtractor configured to calculate the difference between the reactive component (iq2*) of the load currents delayed by the second lead compensatory and the reactive component (iq) of the compensation currents; and
   a second calculator configured to calculate, as the reactive voltage instruction value (Viq), at least a value proportional to the difference obtained by the second subtractor.

5. The power converter device of claim 3, wherein the active current controller further includes:
   a first subtractor configured to calculate the difference between the result of addition (id2*) delayed by the first ad compensator and the active component (id) of the compensation currents;
   a first calculator configured to calculate at least a value proportional to the difference obtained by the first subtractor;
   a first teed forward controller configured to calculate a value based on the result of addition (id2*) delayed by the first lead compensator; and
   a first adder configured to calculate, as the active voltage instruction value (Vid), the sum of the value obtained by the first calculator and the value obtained by the first feed forward controller, and the reactive current controller further includes:
   a second subtractor configured to calculate the difference between the reactive component (iq2*) of the load currents delayed by the second lead compensator and the reactive component (iq) of the compensation currents;
   a second calculator configured to calculate at least a value proportional to the difference obtained by the second subtractor;
   a second feed forward controller configured to calculate a value based on the reactive component (iq2*) of the load currents delayed by the second lead compensator; and
   a second adder configured to calculate, as the reactive voltage instruction value (Viq), the sum of the value obtained by the second calculator and the value obtained by the second feed forward controller.

6. The power converter device of claim 3, wherein the current compensator further includes a reactor between the AC power supply and the compensation current generator, and the active current controller further includes:
   a first subtractor configured to calculate the difference between the result of addition (id2*) delayed by the first lead compensator and the active component (id) of the compensation currents;
   a first voltage calculator configured to calculate a voltage (vLd) of the reactor corresponding to the difference obtained by the first subtractor;
   a first storage section configured to store an input value and output the input value after having delayed the input value for one sample period;
   a second subtractor configured to calculate, and store in the first storage section, the difference between the voltage (vLd) of the reactor corresponding to the difference obtained by the first subtractor and an output of the first storage section; and
   a first adder configured to calculate, as the active voltage instruction value (Vid), the sum of the difference obtained by the second subtractor and the voltage of the AC power supply, and the reactive current controller further includes:
   a third subtractor configured to calculate the difference between the reactive component (iq2*) of the load currents delayed by the second lead compensator and the reactive component (iq) of the compensation currents;
   a second voltage calculator configured to calculate a voltage (vLq) of the read corresponding to the difference obtained by the third subtractor;
   a second storage section configured to store an input value and output the input value after having delayed the input value for one sample period;
   a fourth subtractor configured to calculate, and store in the second storage section, the difference between the voltage (vLq) of the reactor corresponding to the difference obtained by the third subtractor and an output of the second storage section; and
   a second adder configured to calculate, as the reactive voltage instruction value (Viq), the sum of the difference obtained by the fourth subtractor and the voltage of the AC power supply.

7. The power converter device of claim 2, wherein the active current controller includes:
   a first subtractor configured to calculate the difference between the result of addition (id*) and the active component (id) of the compensation currents;
   a first calculator configured to calculate, as a control value (id_out), at least a value proportional to the difference obtained by the first subtractor;
   a first cyclic controller configured to calculate a result of accumulation (id_rpt) by accumulating over multiple periods, with respect to each of multiple sample points in one period of rotation (Tm) of the motor, a corresponding one of a plurality of control values (id_out) obtained by the first calculator; and a first adder configured to calculate, as the active voltage instruction value (Vid), the sum of the control value (id_out) obtained by the first calculator and the result of accumulation (id_rpt) obtained by the first cyclic controller, and the reactive current controller includes:
- a second subtractor configured to calculate the difference between the reactive component (iq*) of the load currents and the reactive component (iq) of the compensation currents;
- a second calculator configured to calculate, as a control value (iq_out), at least a value proportional to the difference obtained by the second subtractor;
- a second cyclic controller configured to calculate a result of accumulation (iq_rpt) by accumulating over multiple periods, with respect to each of multiple sample points in one period (Ts) of the voltage of the AC power supply, a corresponding one of a plurality of control values (iq_out) obtained by the second calculator; and
- a second adder configured to calculate, as the reactive voltage instruction value (Viq), the sum of the control value (iq_put) obtained by the second calculator and the result of accumulation (iq_rpt) obtained by the second cyclic controller.

8. The power converter device of claim 1, wherein the compensation controller includes:
- a high-pass filter configured to extract and output a high-frequency component (imot) from the active component of the load currents;
- a delay controller configured to obtain a delay-compensated high-frequency component (Vmot) by compensating for a delay of the high-frequency component (imot) output from the high-pass filter;
- an active current controller configured to calculate a value to obtain the active voltage instruction value (Vid) such that the active component (id) of the compensation currents cancels the voltage correction value (id*) obtained based on a result of subtraction that has been calculated by subtracting the voltage (Vdc) of the current compensating capacitor from its instruction value (Vdc*);
- an adder configured to obtain, as the active voltage instruction value (Vid), a result of addition by adding the delay-compensated high-frequency component (Vmot) to the value obtained by the active current controller; and
- a reactive current controller configured to obtain the reactive voltage instruction value (Viq) such that the reactive component (iq) of the compensation currents cancels the reactive component (iq*) of the load currents.

* * * * *